(12) United States Patent
Chang et al.

(10) Patent No.: US 10,573,160 B1
(45) Date of Patent: Feb. 25, 2020

(54) MEASURING METHOD FOR HIGH TEMPERATURE THERMAL BRIDGE EFFECT AND LOW TEMPERATURE THERMAL BRIDGE EFFECT AND MEASURING SYSTEM THEREOF

(71) Applicant: RADIANT INNOVATION INC., Hsinchu (TW)

(72) Inventors: Yung-Chang Chang, Hsinchu County (TW); Feng-Lien Huang, Hsinchu (TW)

(73) Assignee: RADIANT INNOVATION INC., Hsinchu (TW)

( * ) Notice: Subject to any disclaimer, the term of this patent is extended or adjusted under 35 U.S.C. 154(b) by 0 days.

(21) Appl. No.: 16/198,694

(22) Filed: Nov. 21, 2018

(51) Int. Cl.
| | | |
|---|---|---|
| B08B 17/00 | (2006.01) | |
| G08B 21/18 | (2006.01) | |
| G08B 5/38 | (2006.01) | |
| G08B 7/06 | (2006.01) | |
| G01K 3/14 | (2006.01) | |
| G01K 3/00 | (2006.01) | |
| G01K 1/02 | (2006.01) | |
| G06F 3/0481 | (2013.01) | |

(52) U.S. Cl.
CPC ............ *G08B 21/182* (2013.01); *G01K 1/02* (2013.01); *G01K 3/005* (2013.01); *G01K 3/14* (2013.01); *G08B 5/38* (2013.01); *G08B 7/06* (2013.01); *G06F 3/04817* (2013.01)

(58) Field of Classification Search
None
See application file for complete search history.

(56) References Cited

U.S. PATENT DOCUMENTS 4,138,878 A * 2/1979 Holmes .................. G01N 25/18
374/7

FOREIGN PATENT DOCUMENTS

CN 104254770 A 12/2014

* cited by examiner

*Primary Examiner* — Julie B Lieu
(74) *Attorney, Agent, or Firm* — Li & Cai Intellectual Property Office

(57) ABSTRACT

Measuring method for high temperature thermal bridge effect and low temperature thermal bridge effect and measuring system thereof are provided. Measuring system for high temperature thermal bridge effect and low temperature thermal bridge effect includes a predetermined zone temperature sensor module providing a first measurement information, an indoor environment temperature sensor module providing a second measurement information, a display module, and a microprocessor module coupled with the predetermined zone temperature sensor module, the indoor environment temperature sensor module, and the display module. A first alarm signal is outputted by the microprocessor module when a difference between the first measurement information and the second measurement information is larger than a first predetermined temperature threshold value. A second alarm signal is outputted by the microprocessor module when the difference between the first measurement information and the second measurement information is smaller than a second predetermined temperature threshold value.

15 Claims, 11 Drawing Sheets

MEASURING METHOD FOR HIGH TEMPERATURE THERMAL BRIDGE EFFECT AND LOW TEMPERATURE THERMAL BRIDGE EFFECT AND MEASURING SYSTEM THEREOF

FIELD OF THE DISCLOSURE

The present disclosure relates to a measuring method and a measuring system, and more particularly to a measuring method for high temperature thermal bridge effect and low temperature thermal bridge effect and a measuring system thereof.

BACKGROUND OF THE DISCLOSURE

Temperature measuring devices are usually classified into contact temperature measuring devices and contactless temperature measuring devices. The contactless temperature measuring devices are extensively applied in daily life.

"Method for contactless temperature measurement for detecting thermal or cold bridges and temperature measuring device thereof" disclosed in Patent No. CN104254770A can determine whether the measured zone has thermal bridge effect. However, the method disclosed in Patent No. CN104254770A cannot determine if the thermal bridge effect is a high temperature thermal bridge effect or a low temperature thermal bridge effect.

SUMMARY OF THE DISCLOSURE

In response to the above-referenced technical inadequacies, the present disclosure provides a measuring method for high temperature thermal bridge effect and low temperature thermal bridge effect and a measuring system thereof.

In one aspect, the present disclosure provides a measuring method for high temperature thermal bridge effect and low temperature thermal bridge effect including steps of obtaining a first measurement information and a second measurement information; wherein the first measurement information is obtained by measuring a temperature of a predetermined zone and the second measurement information is obtained by measuring a temperature of an indoor environment; determining a relation between the first measurement information and the second measurement information; outputting a first alarm signal, a second alarm signal, or the first measurement information; wherein the first alarm signal is outputted when a difference between the first measurement information and the second measurement information is larger than a first predetermined temperature threshold value; wherein the second alarm signal is outputted when the difference between the first measurement information and the second measurement information is smaller than a second predetermined temperature threshold value; wherein the first measurement information is outputted when the difference between the first measurement information and the second measurement information is between the first predetermined temperature threshold value and the second predetermined temperature threshold value.

In one aspect, the present disclosure provides a measuring method for high temperature thermal bridge effect and low temperature thermal bridge effect including steps of: obtaining a first measurement information, a second measurement information, and a third measurement information, wherein the first measurement information is obtained by measuring a temperature of a predetermined zone, the second measurement information is obtained by measuring a temperature of an indoor environment, and the third measurement information is obtained by measuring a temperature of an outdoor environment to avoid false thermal bridge alarm; determining a relation between the first measurement information and the second measurement information; determining a relation between the first measurement information and the third measurement information; outputting a first alarm signal, a second alarm signal, or the first measurement information; wherein the first alarm signal is outputted when a difference between the first measurement information and the second measurement information is larger than a first predetermined temperature threshold value and the first measurement information is smaller than or equal to the third measurement information; wherein the second alarm signal is outputted when the difference between the first measurement information and the second measurement information is smaller than a second predetermined temperature threshold value and the first measurement information is larger than or equal to the third measurement information; wherein the first measurement information is outputted when the difference between the first measurement information and the second measurement information is between the first predetermined temperature threshold value and the second predetermined temperature threshold value.

In one aspect, the present disclosure provides a measuring system for high temperature thermal bridge effect and low temperature thermal bridge effect including a predetermined zone temperature sensor module, an indoor environment temperature sensor module, a display module, and a microprocessor module. The microprocessor module is coupled with the predetermined zone temperature sensor module, the indoor environment temperature sensor module, and the display module. The predetermined zone temperature sensor module provides a first measurement information to the microprocessor module. The indoor environment temperature sensor module provides a second measurement information to the microprocessor module. The first measurement information is obtained by measuring a temperature of a predetermined zone. The second measurement information is obtained by measuring a temperature of an indoor environment. A first alarm signal is outputted from the microprocessor module when a difference between the first measurement information and the second measurement information is larger than a first predetermined temperature threshold value. A second alarm signal is outputted from the microprocessor module when the difference between the first measurement information and the second measurement information is smaller than a second predetermined temperature threshold value. The first measurement information is outputted from the microprocessor module to the display module when the difference between the first measurement information and the second measurement information is between the first predetermined temperature threshold value and the second predetermined temperature threshold value.

Therefore, the measuring method for high temperature thermal bridge effect and low temperature thermal bridge effect and the measuring system thereof uses the technical features of "outputting the first alarm signal when the difference between the first measurement information and the second measurement information is larger than the first predetermined temperature threshold value", "outputting the second alarm signal when the difference between the first measurement information and the second measurement information is smaller than the second predetermined temperature threshold value", and "outputting the first measurement information when the difference between the first measurement information and the second measurement information is between the first predetermined temperature threshold value and the second predetermined temperature threshold value" to determine a high temperature thermal bridge effect or a low temperature thermal bridge effect in the detection area.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, in which.

DETAILED DESCRIPTION OF THE EXEMPLARY EMBODIMENTS

Figure 1:
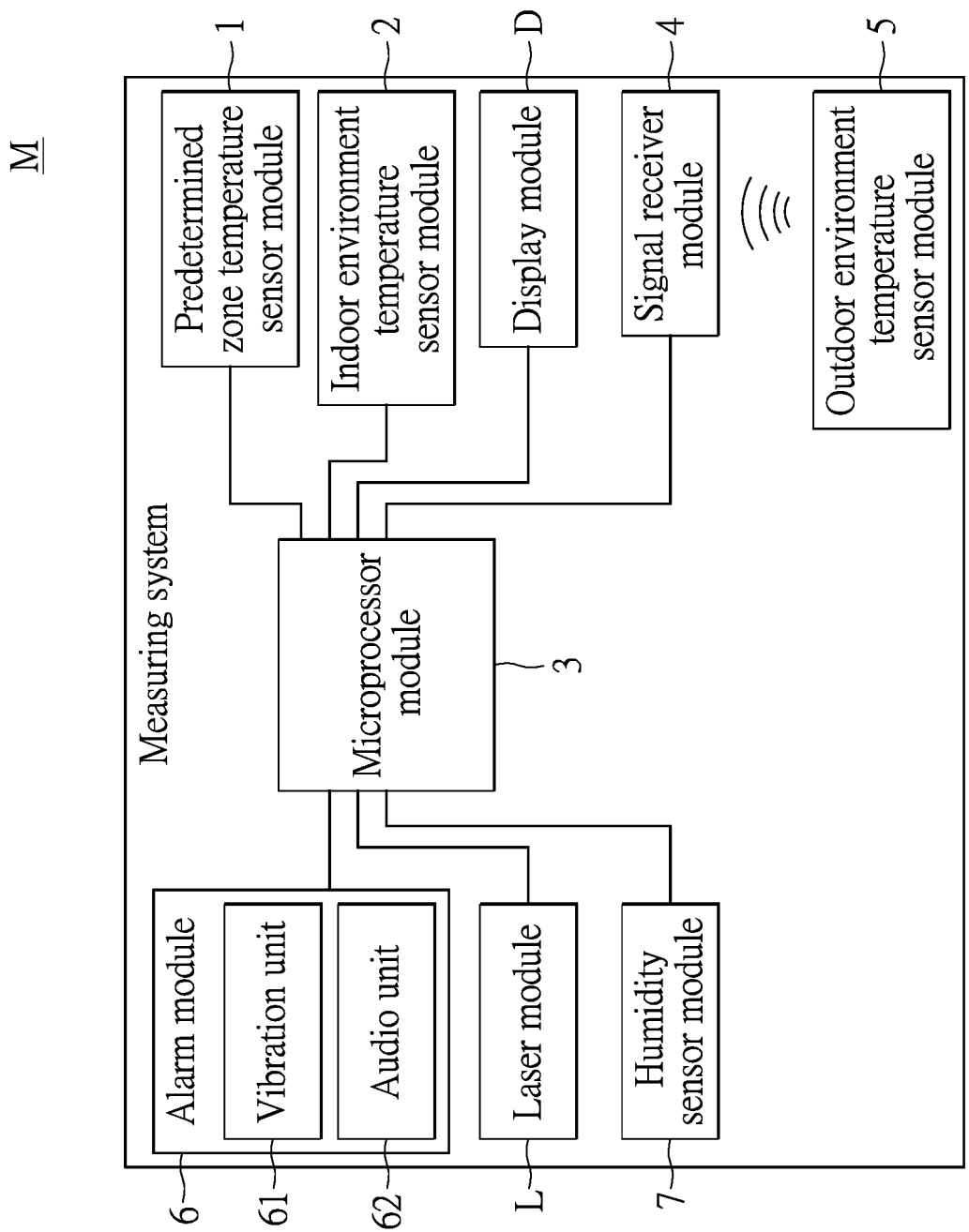
FIG. 1 is a functional block diagram of a measuring system for high temperature thermal bridge effect and low temperature thermal bridge effect according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
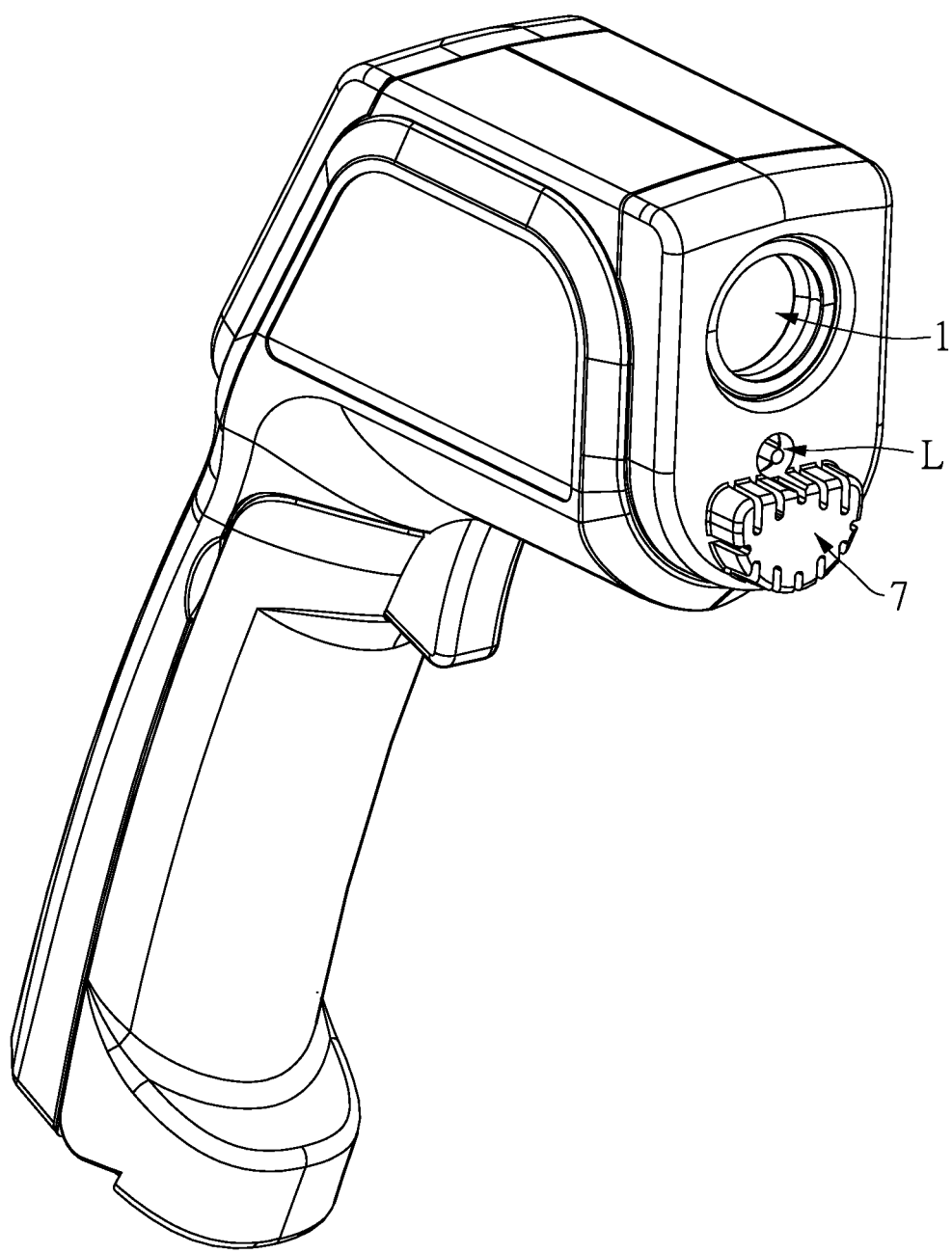
FIG. 2 is a perspective schematic view of the measuring device for high temperature thermal bridge effect and low temperature thermal bridge effect according to the first embodiment of the present disclosure.
Figure 3:
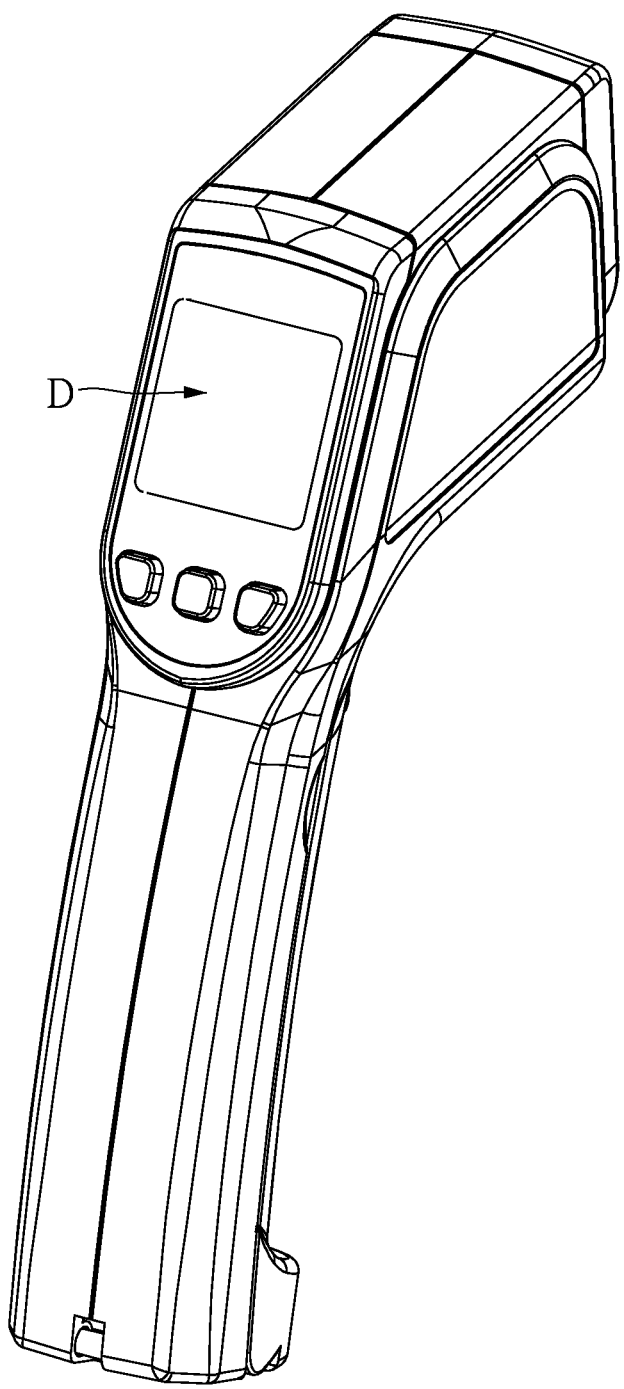
FIG. 3 is another perspective schematic view of the measuring device for high temperature thermal bridge effect and low temperature thermal bridge effect according to the first embodiment of the present disclosure.

Referring to FIG. 1 to FIG. 3, FIG. 1 is a functional block diagram of a measuring system M for high temperature thermal bridge effect and low temperature thermal bridge effect according to a first embodiment of the present disclosure. FIG. 2 and FIG. 3 respectively are perspective schematic views of the measuring system M of a measuring device A for high temperature thermal bridge effect and low temperature thermal bridge effect according to the first embodiment of the present disclosure. The present disclosure provides a measuring method for high temperature thermal bridge effect and low temperature thermal bridge effect and the measuring system M thereof. The entire structure of the measuring system M for high temperature thermal bridge effect and low temperature thermal bridge effect is illustrated in the first embodiment. The measuring method for high temperature thermal bridge effect and low temperature thermal bridge effect is illustrated in a second embodiment and a third embodiment. In addition, the measuring system M for high temperature thermal bridge effect and low temperature thermal bridge effect of the present disclosure can be applied in the measuring device A for temperature measurement. The measuring device A can be an infrared thermometer, but is not limited thereto.

As mentioned above, referring to FIG. 1, the measuring system M for high temperature thermal bridge effect and low temperature thermal bridge effect includes a predetermined zone temperature sensor module 1, an indoor environment temperature sensor module 2, a display module D, and a microprocessor module 3. The microprocessor module 3 is coupled with the predetermined zone temperature sensor module 1, the indoor environment temperature sensor module 2, and the display module D. It is notable that the word of "coupled" in the present disclosure can mean direct electrical connection, indirect electrical connection, or wireless connection, but is not limited thereto. Furthermore, the predetermined zone temperature sensor module 1 can be infrared thermometers and the microprocessor module 3 can be microcontroller units (MCU), but is not limited to that disclosed herein.

A first measurement information is provided by the predetermined zone temperature sensor module 1 to the microprocessor module 3. A second measurement information is provided by the indoor environment temperature sensor module 2 to the microprocessor module 3. The first measurement information is obtained by measuring a temperature of a predetermined zone Z. The second measurement information is obtained by measuring a temperature of an indoor environment. A relation between the first measurement information and the second measurement information is determined by the microprocessor module 3 through calculations. A first alarm signal can be outputted from the microprocessor module 3 and the first measurement information can be displayed on the display module D when a difference between the first measurement information and the second measurement information is larger than a first predetermined temperature threshold value. A second alarm signal can be outputted from the microprocessor module 3 and the first measurement information can be displayed onto the display module D when the difference between the first measurement information and the second measurement information is smaller than a second predetermined temperature threshold value. The first measurement information can be outputted from the microprocessor module 3 and can be displayed on the display module D when the difference between the first measurement information and the second measurement information is between the first predetermined temperature threshold value and the second predetermined temperature threshold value. In other words, the first measurement information detected by the predetermined zone temperature sensor module 1 can be displayed on the display module D. That is, a temperature value measured by the predetermined zone temperature sensor module 1 can be displayed on the display module D. In an embodiment, the first alarm signal and the second alarm signal outputted from the microprocessor module 3 can be displayed on the display module D. In the present disclosure, ways of reminder are not limited to the first alarm signal and the second alarm signal. In the present disclosure, the first predetermined temperature threshold value and the second predetermined temperature threshold value are different. Preferably, in other embodiments, the first predetermined temperature threshold value is larger than 0° C. and the second predetermined temperature threshold value is smaller than 0° C. Specific determination processes of the microprocessor module 3 are illustrated in the second embodiment and the third embodiment of the present disclosure.

Figure 4:
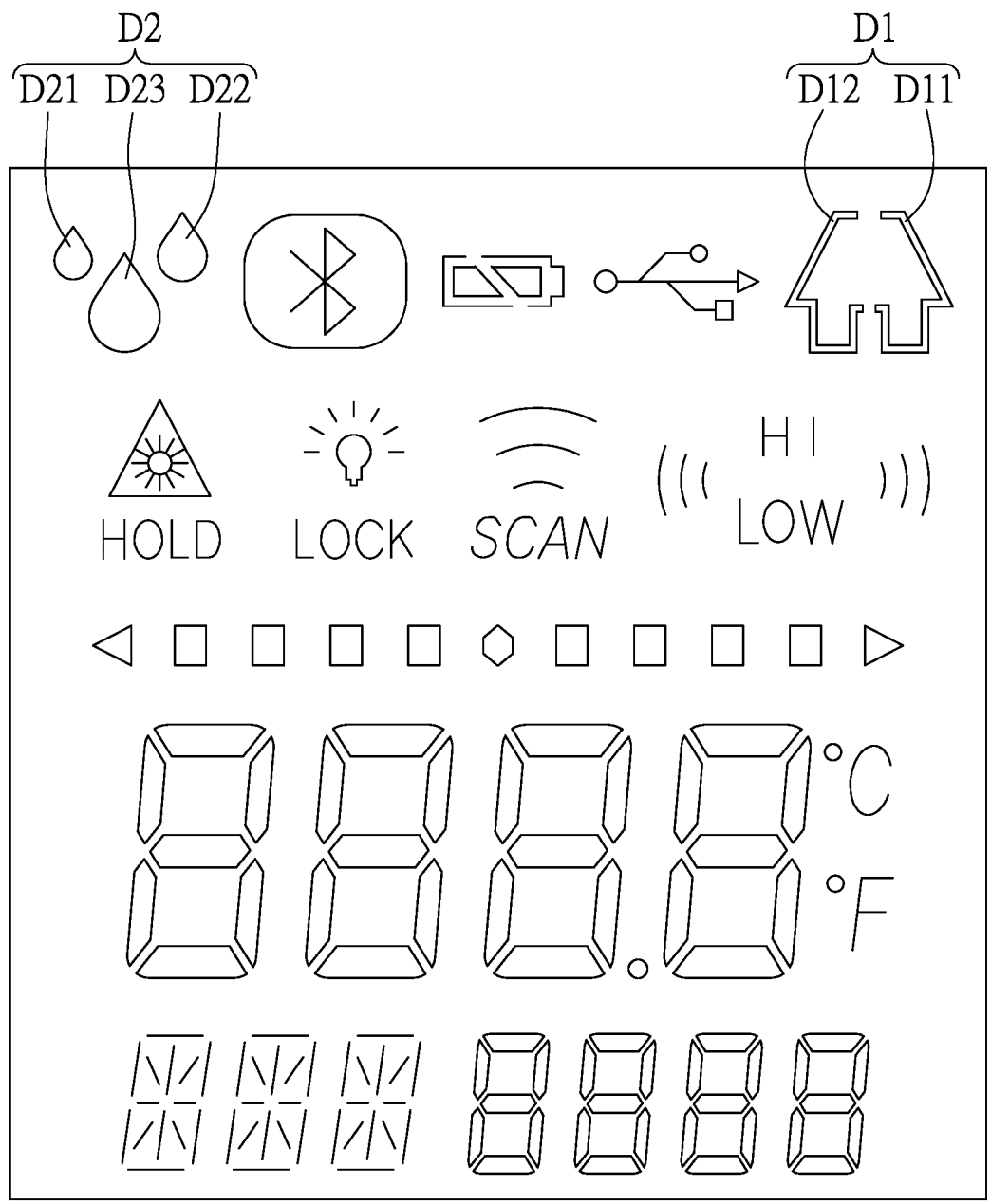
FIG. 4 is a schematic view of a screen display of a display module of the measuring device for high temperature thermal bridge effect and low temperature thermal bridge effect according to the first embodiment of the present disclosure.

Referring to FIG. 1 in conjunction with FIG. 4, FIG. 4 is a schematic view of a screen display of the display module D of the measuring device A for high temperature thermal bridge effect and low temperature thermal bridge effect. For example, information such as temperature or humidity can be displayed onto the display module D. Furthermore, the first alarm signal and the second alarm signal can also be displayed on the display module D. In an embodiment, the first alarm signal is displayed by a flashing or a lighting of a first icon D11 of a first image D1 on the display module D. The second alarm signal is displayed by a flashing or a lighting of a second icon D12 of a first image D1 on the display module D, but not limited thereto. In other words, through the flashing or the lighting of the first icon D11 or the second icon D12, measurement information can be distinguished into that of high temperature thermal bridge effect or low temperature thermal bridge effect. Preferably, a display method of the first alarm signal and a display method of the second alarm signal are different, that is, a position of the first icon D11 and a position of the second icon D12 are different, but is not limited thereto.

Referring to FIG. 1 to FIG. 3, the measuring system M includes an alarm module 6 coupled with the microprocessor module 3 which can produce alarm signals by other methods. Specifically, the alarm module 6 includes a vibration unit 61 and an audio unit 62. Both the vibration unit 61 and the audio unit 62 are independently coupled with the microprocessor module 3. The first alarm signal and the second alarm signal can be produced by the alarm module 6. For example, the vibration unit 61 and/or the audio unit 62 can be triggered by the microprocessor module 3 and produce vibration and/or sound to remind users when the first alarm signal and the second alarm signal need to be outputted. In addition, the vibration unit 61 can be a vibration motor which can produce vibration through its eccentric structure, but is not limited thereto. A vibration frequency of the vibration unit 61 can be controlled by the microprocessor module 3. The audio unit 62 can be but is not limited to a speaker or other sound generators. That is, the first alarm signal and the second alarm signal can include audio alarms and/or vibration alarms.

Figure 5:
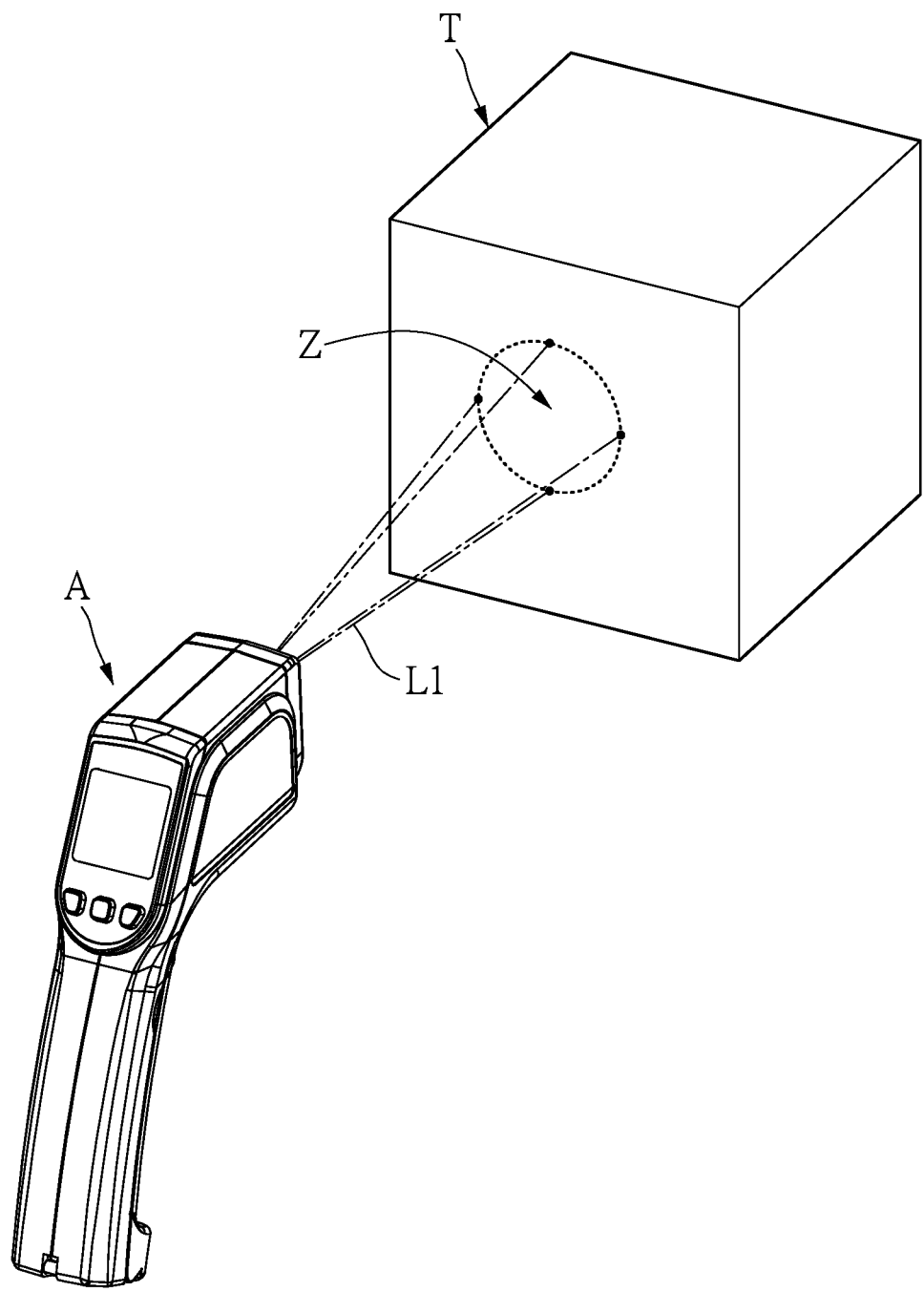
FIG. 5 is a schematic view of the measuring device for high temperature thermal bridge effect and low temperature thermal bridge effect in operation according to the first embodiment of the present disclosure.

Referring to FIG. 1 to FIG. 3 in conjunction with FIG. 5, the measuring system M further includes a laser module L coupled with the microprocessor module 3 to emit a marking light source L1 toward an object T or encircling a predetermined zone Z. Taking the disclosure in FIG. 5 as example, a laser light source emitted from the laser module L acts as the marking light source L1 and encircles the predetermined zone Z toward the object T. The marking light source L1 can clearly show a detection area (also called the predetermined zone Z). For example, an optical path of the marking light source L1 is substantially parallel to a detection path of the predetermined zone temperature sensor module 1 to aim at the detection area. In other words, the laser module L can emit a bundle of laser beams or a plurality of bundles of laser beams. The bundle of laser beams can be aimed at the object T or the predetermined zone Z by moving the measuring device A. In other embodiments, the plurality of bundles of laser beams can be emitted by using a plurality of the laser module L or by using the laser module L cooperating with a beam splitter to encircle the detection area. That is, the detection area is substantially equal to the area measured by the predetermined zone temperature sensor module 1. In other preferable embodiments, the more bundles of laser beams are used, the more clearly the detection area can be marked. In addition, inclusion of the laser module L is not limited to that disclosed herein, the marking light source L1 can be emitted by other light sources to replace the laser module L.

It is notable that the first alarm signal and the second alarm signal can be displayed by the laser module L. When the first alarm signal and the second alarm signal need to be produced, the microprocessor module 3 will trigger the laser module L to produce flashing laser light sources. In other words, when there is no need to output the first alarm signal and the second alarm signal, the laser module L produces continuously lighting laser light sources; while, when the first alarm signal and the second alarm signal need to be outputted, the laser module L produces the flashing laser light sources to remind users looking at the detection area. That is, the first alarm signal and the second alarm signal include flashing alarms.

Referring to FIG. 1 to FIG. 3, the measuring system M can further include a humidity sensor module 7 coupled with the microprocessor module 3. The humidity module 7 can detect a dry-bulb temperature, a wet-bulb temperature, a dew point temperature, or relative humidity. Furthermore, the dry-bulb temperature, the wet-bulb temperature, the dew point temperature, or the relative humidity can be displayed onto the display module D. In other embodiments, a third alarm signal is outputted by the microprocessor module 3 to remind users when the dry-bulb temperature is beyond a range of a predetermined dry-bulb temperature threshold value, the wet-bulb temperature is beyond a range of a predetermined wet-bulb temperature threshold value, the dew point temperature is beyond a range of a predetermined dew point temperature threshold value, or the relative humidity is beyond a range of a predetermined relative humidity threshold value. For example, ways of reminder are not limited to producing vibrations by the vibration unit 61, producing sounds by the audio unit 62, or producing the flashing laser light sources by the laser module L.

Referring to FIG. 4, the third alarm signal can be displayed by a third icon D21, a fourth icon D22, and a fifth icon D23 of a second image D2 onto the display module D. Taking the situation of the relative humidity beyond the range of the predetermined relative humidity threshold value as example, the relative humidity threshold value includes a first threshold value, a second threshold value, and a third threshold value. The first threshold value can be smaller than the second threshold value and the second threshold value can be smaller than the third threshold value. For example, the first threshold value can be 60%, the second threshold value can be 75%, and the third threshold value can be 90%. The third alarm signal will not be outputted when the relative humidity is smaller than the first threshold value. The third icon D21 of the second image D2 can be displayed when the relative humidity is between the first threshold value and the second threshold value. Both the third icon D21 and the fourth icon D22 of the second image D2 can be displayed when the relative humidity is between the second threshold value and the third threshold value. The third icon D21, the fourth icon D22, and the fifth icon D23 of the second image D2 can be displayed when the relative humidity is larger than the third threshold value, but not limited thereto. That is, the number of water drops displayed onto the display module D corresponds to the value of the relative humidity detected by the humidity sensor module 7.

Furthermore, the third alarm signal can be outputted when the dry-bulb temperature is beyond a range of a predetermined dry-bulb temperature, the wet-bulb temperature is beyond a range of a predetermined wet-bulb temperature, or the dew point temperature is beyond a range of a predetermined dew point temperature. Similarly, the third icon D21, the fourth icon D22, and the fifth icon D23 of the second image D2 can be displayed corresponding to the situation of the relative humidity beyond the range of the predetermined relative humidity threshold value disclosed herein.

Figure 6:
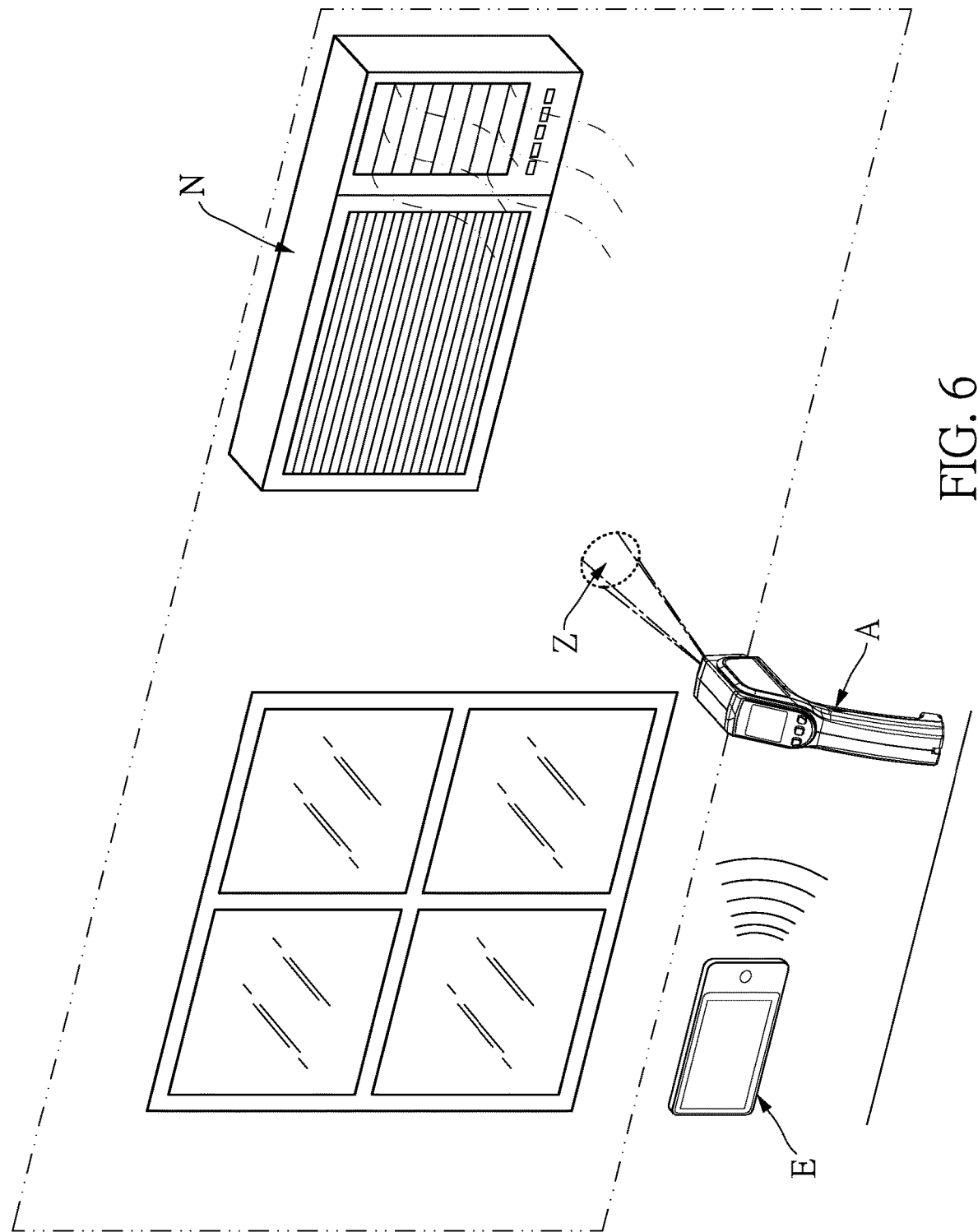
FIG. 6 is another schematic view of the measuring device for high temperature thermal bridge effect and low temperature thermal bridge effect in operation according to the first embodiment of the present disclosure.

Referring to FIG. 1 in conjunction with FIG. 6, FIG. 6 is another schematic view of the measuring device A for high temperature thermal bridge effect and low temperature thermal bridge effect in operation according to the first embodiment of the present disclosure. The measuring device A can measure the predetermined zone Z projected or encircled by the laser light of the laser module L to distinguish the predetermined zone Z into high temperature thermal bridge effect or low temperature thermal bridge effect. Preferably, the measuring system M further includes a signal receiver module 4. The microprocessor module 3 is coupled with the signal receiver module 4 to receive a third measurement information obtained by measuring a temperature of an outdoor environment. For example, the signal receiver module 4 can be a blue tooth module or other wireless or wired receiver modules. In addition, referring to FIG. 6, the signal receiver module 4 can be coupled with an electric device E (such as but not limited to cellphone) to obtain the temperature of the outdoor environment. Temperature information measured from the outdoor environment can be transmitted from the electric device E to the signal receiver module 4. In other words, almost all electric devices E have a function to connect with the Internet so that the temperature of the outdoor environment where users are located at can be obtained through the electric device E. In other embodiments, the measuring system M can directly connect with the Internet to obtain the third measurement information through the signal receiver module 4, so that the inclusion of the electric device E is not limited to present disclosure. By virtue of the temperature of the outdoor environment, the accuracy of distinguishing into high temperature thermal bridge effect and low temperature thermal bridge effect can be further enhanced, and false alarm can be avoided. The specific determination process is illustrated in the second embodiment and the third embodiment.

Figure 7:
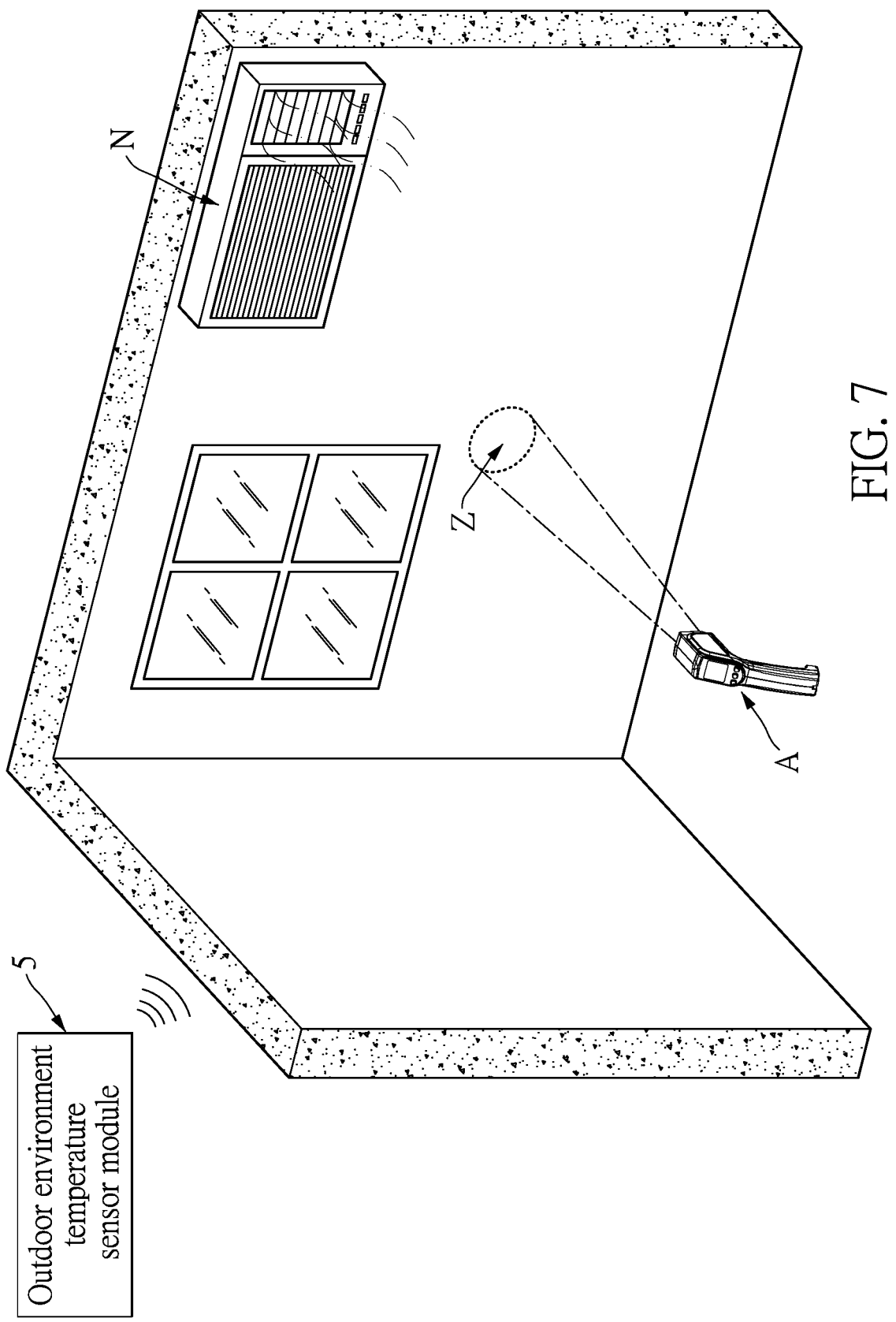
FIG. 7 is another schematic view of the measuring device for high temperature thermal bridge effect and low temperature thermal bridge effect in operation according to the first embodiment of the present disclosure.

Referring to FIG. 1 in conjunction with FIG. 7, FIG. 7 is another schematic view of the measuring device for high temperature thermal bridge effect and low temperature thermal bridge effect in operation according to the first embodiment of the present disclosure. The measuring system M further includes a signal receiver module 4 and an outdoor environment temperature sensor module 5. Both the signal receiver module 4 and the outdoor environment temperature sensor module 5 are independently coupled with the microprocessor module 3. A third measurement information is provided by the outdoor environment temperature sensor module 5 and the third measurement information is received by the signal receiver module 4. The third measurement information is obtained by measuring a temperature of an outdoor environment. That is, the outdoor environment temperature sensor module 5 can be a thermometer which can transmit the temperature information of the outdoor environment to the signal receiver module 4, but is not limited thereto.

Second Embodiment

Figure 8:
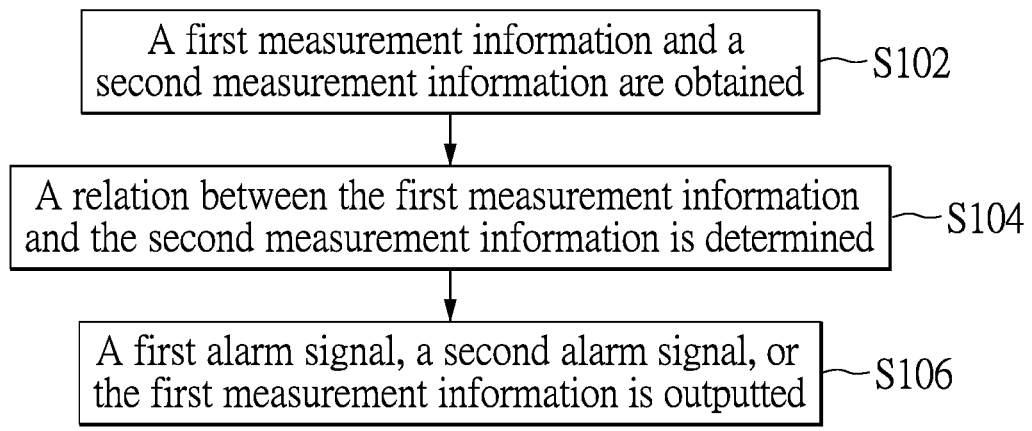
FIG. 8 is a flow diagram of the measuring method for high temperature thermal bridge effect and low temperature thermal bridge effect according to a second embodiment of the present disclosure.
Figure 9:
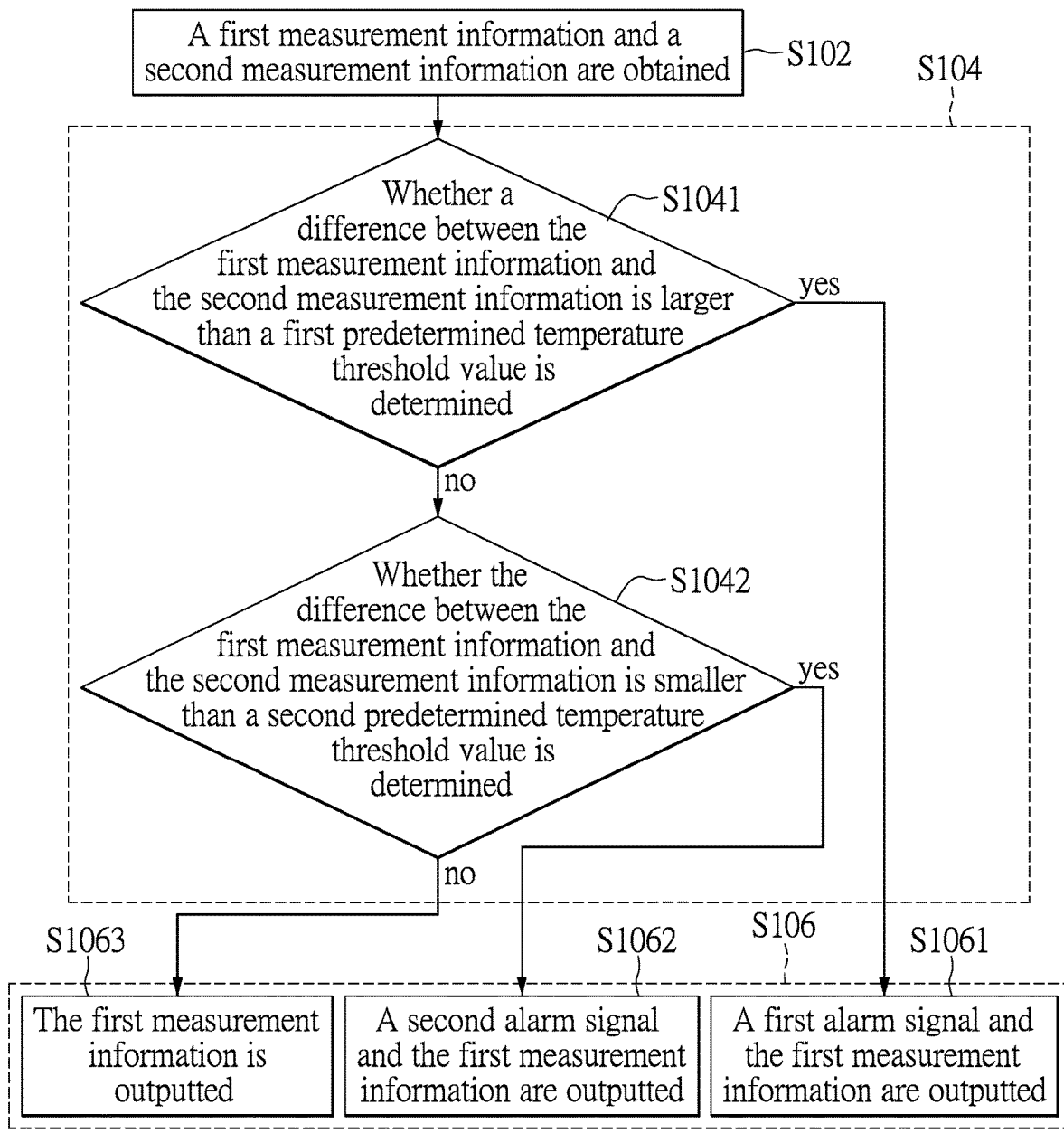
FIG. 9 is another flow diagram of the measuring method for high temperature thermal bridge effect and low temperature thermal bridge effect according to the second embodiment of the present disclosure.

Referring to FIG. 8 and FIG. 9 in conjunction with FIG. 1 and FIG. 4, FIG. 8 is a flow chart of a measuring method for high temperature thermal bridge effect and low temperature thermal bridge effect according to a second embodiment of the present disclosure. FIG. 9 is another flow chart of the measuring method for high temperature thermal bridge effect and low temperature thermal bridge effect according to the second embodiment of the present disclosure. Specifically, the measuring method for high temperature thermal bridge effect and low temperature thermal bridge effect can be conducted by steps as follow. In step S102, a first measurement information and a second measurement information are obtained. For example, the first measurement information can be obtained by measuring a temperature of a predetermined zone Z, and the second measurement information can be obtained by measuring a temperature of an indoor environment. The first measurement information and the second measurement information can be obtained by a measuring system M provided by the first embodiment of the present disclosure.

In step S104, a relation between the first measurement information and the second measurement information is determined. For example, the relation between the first measurement information and the second measurement information can be determined by a microprocessor module 3 through calculations. Further, in step S106, a first alarm signal, a second alarm signal, or the first measurement information is outputted. For example, whether the first alarm signal, the second alarm signal, or the first measurement information is outputted is based on the relation between the first measurement information and the second measurement information.

Referring to FIG. 9, in step S1041, whether a difference between the first measurement information and the second measurement information is larger than a first predetermined temperature threshold value is determined. The first alarm signal is outputted when the difference between the first measurement information and the second measurement information is larger than the first predetermined temperature threshold value. That is, the first alarm signal can be outputted when a result of the first measurement information (the temperature of the predetermined zone Z) minus the second measurement information (the temperature of the indoor environment) is larger than the first predetermined temperature threshold value. Preferably, the first measurement information (the temperature of the predetermined zone Z) is displayed on the display module D concurrently with an output of the first alarm signal. That is, the first alarm signal and the first measurement information can be outputted concurrently as shown in step S1061. However, whether to concurrently output the first alarm signal and the first measurement information is not limited to the present disclosure.

In step S1042, whether the difference between the first measurement information and the second measurement information is smaller than a second predetermined temperature threshold value is determined. That is, the step S1042 is processed when the difference between the first measurement information and the second measurement information is not more than the second predetermined temperature threshold value. The second alarm signal is outputted when the difference between the first measurement information and the second measurement information is smaller than the second predetermined temperature threshold value. In other words, the second alarm signal can be outputted when the result of the first measurement information (the temperature of the predetermined zone Z) minus the second measurement information (the temperature of the indoor environment) is smaller than the second predetermined temperature threshold value. Preferably, the first measurement information (the temperature of the predetermined zone Z) can be displayed on the display module D concurrently with an output of the second alarm signal. That is, the second alarm signal and the first measurement information can be outputted concurrently as shown in step S1062. However, whether to concurrently output the first alarm signal and the first measurement information is not limited to the present disclosure.

In step S1063, the first measurement information is outputted. That is, the step S1063 is processed when the difference between the first measurement and the second measurement is not smaller than the second predetermined temperature threshold value to display the first measurement information (the temperature of the predetermined zone Z) on the display module D. That is, the first measurement information can be outputted when the difference between the first measurement information and the second measurement information is between the first predetermined temperature threshold value and the second predetermined temperature threshold value. In addition, the determination disclosed herein can be calculated by the microprocessor module 3. For example, the first measurement information and the second measurement information can be a temperature value, and the temperature scale adopted for the first measurement information and the second measurement information can be the Celsius scale (° C.), but is not limited thereto. Furthermore, the first predetermined temperature threshold value can be 5.75° C. and the second predetermined temperature threshold value can be −5.75° C., but is not limited thereto. In other embodiments, the first predetermined temperature threshold value can be 6.5° C. and the second predetermined temperature threshold value can be −6.5° C. That is, the first predetermined temperature threshold value and the second predetermined temperature threshold value can be adjusted according to practical requirements. In present embodiment, the first predetermined temperature threshold value and the second predetermined temperature threshold value are different. Preferably, in an embodiment, the first predetermined temperature threshold value is larger than 0° C. and the second predetermined temperature threshold value is smaller than 0° C.

Referring to FIG. 1 and FIG. 4, the first alarm signal can be a flashing or a lighting of the first icon D11 of the first image D1 on the display module D and the second alarm signal can be a flashing or a lighting of the second icon D12 of the first image D1 on the display module D, but is not limited thereto. Preferably, a color of the first icon D11 and a color of the second icon D12 are different. For example, the color of the first icon D11 can be red and the color of the second icon D12 can be blue to enhance the convenience of use, but the present disclosure is not limited to that disclosed herein.

Preferably, a flashing frequency of the first icon D11 and a flashing frequency of the second icon D12 can be adjusted according to the difference between the first measurement information and the second measurement information. For example, the larger the difference between the first measurement information and the second measurement information is, the faster the flashing frequency of the first icon D11 can be. The smaller the difference between the first measurement information and the second measurement information is, the faster the flashing frequency of the second icon D12 can be, but it is not limited thereto.

Referring to FIG. 4 to FIG. 7, a display of the first icon D11 (by flashing or by lighting) represents that the high temperature thermal bridge effect is detected; a display of the second icon D12 (by flashing or by lighting) represents that the low temperature thermal bridge effect is detected. Specifically, high temperature thermal bridge effect represents that the predetermined zone Z has low thermal insulation property, so that heat can be easily transferred from the outdoor environment into the indoor environment and result in energy waste when air conditioners are used in summer. Low temperature thermal bridge effect represents that the predetermined zone Z has low thermal insulation property, so that dew or mold tend to be formed in the predetermined zone Z. In other words, a state of the predetermined zone Z can be understood by the determination of high temperature thermal bridge effect or low temperature thermal bridge effect. It is notable that the first alarm signal and the second alarm signal can further include flashing alarms, sound alarms, or vibration alarms similar to those previously described in embodiments. Specifically, the flashing alarms, the sound alarms, and the vibration alarms can be produced respectively by the laser module L, the audio module 62 and the vibration unit 61.

For example, the first alarm signal can be the flashing or the lighting of the first icon D11 on the display module D. The second alarm signal can be the flashing or the lighting of the second icon D12 on the display module D. The first alarm signal and the second alarm signal can selectively include the flashing alarms, the sound alarms, or the vibration alarms, but is not limited thereto. In other words, the first alarm signal can be the flashing or the lighting of the first icon D11 on the display module D, the flashing alarms, the sounds alarms, or the vibration alarms. The second alarm signal can be the flashing or the lighting of the second icon D12 on the display module D, the flashing alarms, the sounds alarms, or the vibration alarms. Referring to the table below, for example, the first predetermined temperature threshold value is 6.5° C. and the second predetermined temperature threshold value is −6.5° C. in the table below. At the same time, a third predetermined temperature threshold value being 5.75° C. and a fourth predetermined temperature threshold value being −5.75° C. are also taken as examples. The flashing or the lighting of the first icon D11, the flashing alarms, the sounds alarms, or the vibration alarms are outputted when the difference between the first measurement information and the second measurement information is larger than the first predetermined temperature threshold value. The flashing or the lighting of the second icon D12, the flashing alarms, the sounds alarms, or the vibration alarms are outputted when the difference between the first measurement information and the second measurement information is smaller than the second predetermined temperature threshold value. The flashing alarms, the sounds alarms, or the vibration alarms are outputted when the difference between the first measurement information and the second measurement information is both larger than the first predetermined temperature threshold value and between the first predetermined temperature threshold value and the third predetermined temperature threshold value. The flashing alarms, the sounds alarms, or the vibration alarms are also outputted when the difference between the first measurement information and the second measurement information is both smaller than the second predetermined temperature threshold value and between the second predetermined temperature threshold value and the fourth predetermined temperature threshold value. Only the first measurement information (without any alarm signals) is outputted when the difference between the first measurement information and the second measurement information is either between the first predetermined temperature threshold value and second predetermined temperature threshold value or between the third predetermined temperature threshold value and fourth predetermined temperature threshold value.

| Difference between the first measurement information and the second measurement information | Smaller than −6.5° C. | Smaller than −5.75° C. | Between −5.75° C. and 5.75° C. | Larger than 5.75° C. | Larger than 6.5° C. |
|---|---|---|---|---|---|
| Alarm signals | Flashing or lighting of the second icon, flashing alarms, sound alarms, or vibration alarms | Flashing alarms, sound alarms, or vibration alarms | None | Flashing alarms, sound alarms, or vibration alarms | Flashing or lighting of the first icon, flashing alarms, sound alarms, or vibration alarms |

Third Embodiment

Figure 10:
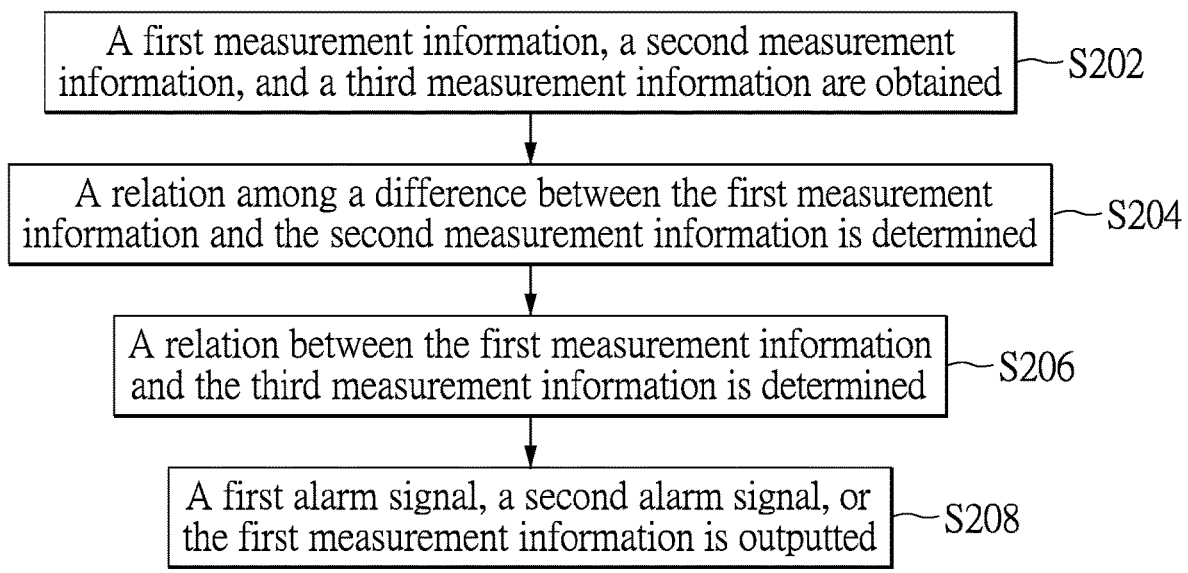
FIG. 10 is a flow diagram of the measuring method for high temperature thermal bridge effect and low temperature thermal bridge effect according to a third embodiment of the present disclosure.
Figure 11:
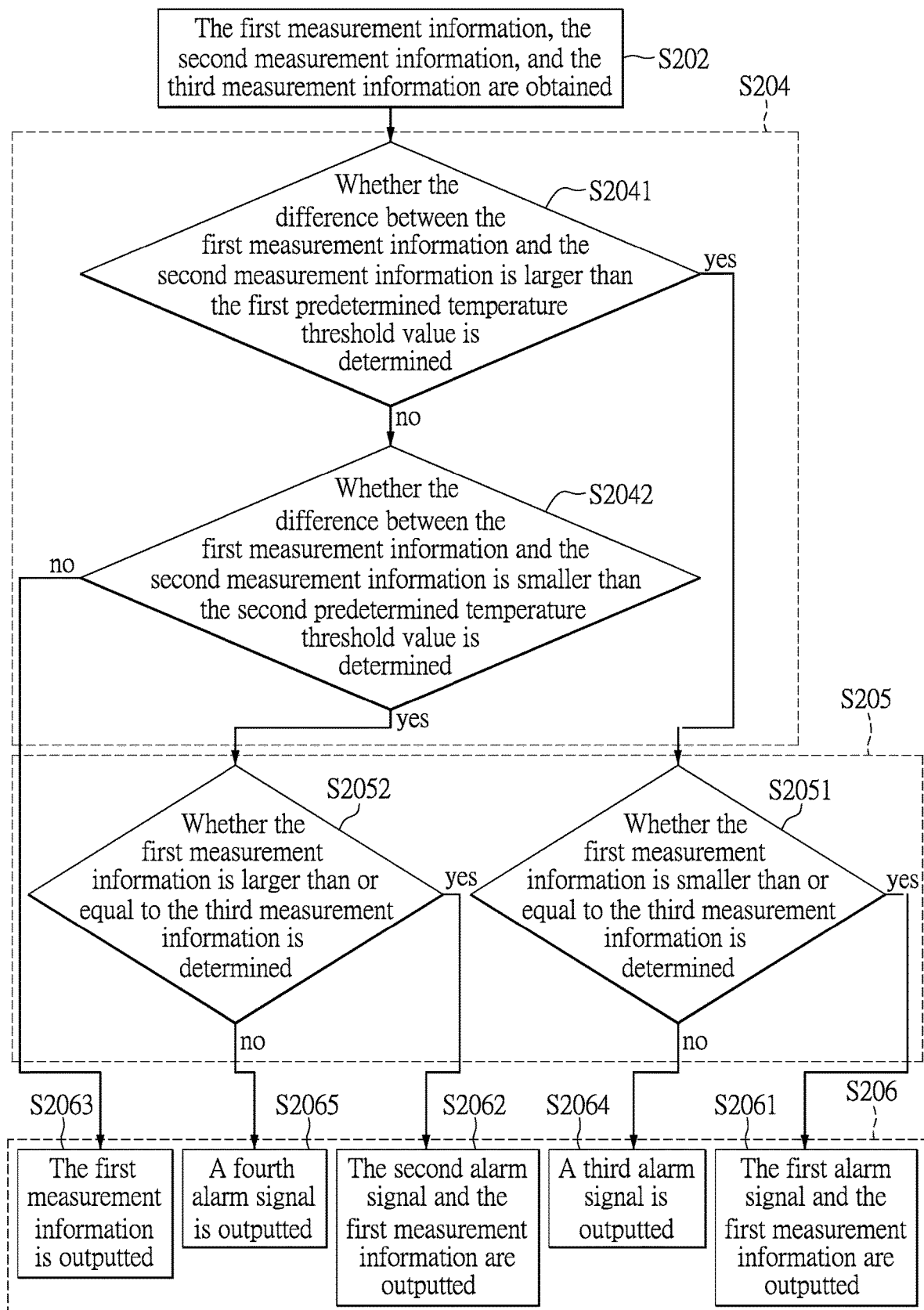
FIG. 11 is another flow diagram of the measuring method for high temperature thermal bridge effect and low temperature thermal bridge effect according to the third embodiment of the present disclosure.

Referring to FIG. 10 and FIG. 11, FIG. 10 is a flow chart of a measuring method for high temperature thermal bridge effect and low temperature thermal bridge effect according to a third embodiment of the present disclosure. FIG. 11 is another flow chart of the measuring method for high temperature thermal bridge effect and low temperature thermal bridge effect according to the third embodiment of the present disclosure. Comparing FIG. 10 with FIG. 8, a difference between the third embodiment and the second embodiment is that the step of obtaining a first measurement information and a second measurement information further includes a step of obtaining a third measurement information. The step of obtaining the third measurement information includes a step of determining a relation between the first measurement information and the third measurement information.

Specifically, in step S202, the first measurement information, the second measurement information, and the third measurement information are obtained. For example, the first measurement information is obtained by measuring a temperature of a predetermined zone Z. The second measurement information is obtained by measuring a temperature of an indoor environment. The third measurement information is obtained by measuring a temperature of an outdoor environment. In addition, the first measurement information, the second measurement information, and the third measurement information can be obtained by a measuring system M described in the first embodiment.

In step S204, a relation among a difference between the first measurement information and the second measurement information, the first predetermined temperature threshold value, and the second predetermined temperature threshold value is determined. For example, a relation between the first measurement information and the second measurement information can be determined by the microprocessor module 3 through calculation. In step S206, a relation between the first measurement information and the third measurement information is determined. Further, in step S208, a first alarm signal, a second alarm signal, or the first measurement information is outputted. For example, whether the first alarm signal, the second alarm signal, or the first measurement information is outputted is determined by the relation between the first measurement information and the second measurement information and by the relation between the first measurement information and the third measurement information. In the embodiment, the step S204 is performed earlier than the step S206 as an example. In other embodiments, the step S206 can also be performed earlier than the step S204. In other embodiments, the step S204 and the step S206 can be performed concurrently. That is, sequence of the step S204 and the step S206 is not limited to that disclosed herein.

In the third embodiment, the first alarm signal is outputted when the difference between the first measurement information and the second measurement information is larger than the first predetermined temperature threshold value and the first measurement information is smaller than or equal to the third measurement information. In addition, the second alarm signal is outputted when the difference between the first measurement information and the second measurement information is smaller than the second predetermined temperature threshold value and the first measurement information is larger than or equal to the third measurement information. Furthermore, the first measurement information is outputted when the difference between the first measurement information and the second measurement information is between the first predetermined temperature threshold value and the second predetermined temperature threshold value.

Referring to FIG. 11, in step S2041, whether the difference between the first measurement information and the second measurement information is larger than the first predetermined temperature threshold value is determined. A step S2051 is performed when the difference between the first measurement information and the second measurement information is larger than the first predetermined temperature threshold value. In the step S2051, whether the first measurement information is smaller than or equal to the third measurement information is determined. A step of S2061 is processed when the first measurement information is smaller than or equal to the third measurement information. In the step S2061, the first alarm signal is outputted. Preferably, the first measurement information (the temperature of the predetermined zone Z) can be displayed on the display module D concurrently with an output of the first alarm signal. That is, the first alarm signal and the first measurement information are outputted concurrently as shown in the step S2061. In a step S2064, a third alarm signal is outputted. That is, the step S2064 is performed when the first measurement information is not smaller than or equal to the third measurement information.

Referring to FIG. 11, in a step S2042, whether the difference between the first measurement information and the second measurement information is smaller than the second predetermined temperature threshold value is determined. That is, the step S2042 is performed when the difference between the first measurement information and the second measurement information is not larger than the second predetermined temperature threshold value. A step S2052 is performed when the difference between the first measurement information and the second measurement information is smaller than the second predetermined temperature threshold value. In the step S2052, whether the first measurement information is larger than or equal to the third measurement information is determined. A step S2062 is performed when the first measurement information is larger than or equal to the third measurement information. In the step S2062, the second alarm signal is outputted. Preferably, the first measurement information (the temperature of the predetermined zone Z) can be displayed on the display module D concurrently with an output of the second alarm signal. That is, the second alarm signal and the first measurement information can be outputted concurrently as shown in the step S2062. In a step S2065, a fourth alarm signal is outputted when the first measurement information is not larger or equal to the third measurement information.

Referring to FIG. 11, in a step S2063, the first measurement information is outputted. That is, the step S2063 is performed when the difference between the first measurement information and the second measurement information is not larger than the first predetermined temperature threshold value and the difference between the first measurement information and the second measurement information is not smaller than the second predetermined temperature threshold value. That is, the first measurement information is outputted when the difference between the first measurement information and the second measurement information is between the first predetermined temperature threshold value and the second predetermined temperature threshold value. The determination method disclosed herein is calculated by the microprocessor module 3. For example, the first measurement information and the second measurement information can be a temperature, and the temperature scale adopted for the first measurement information and the second measurement information can be the Celsius scale, but is not limited thereto. Further, the first predetermined temperature threshold value is 5.75° C. and the second predetermined temperature threshold value is −5.75° C., but is not limited thereto. In other embodiments, the first predetermined temperature threshold value can be 6.5° C. and the second predetermined temperature threshold value can be −6.5° C. In other words, the first predetermined temperature threshold value and the second predetermined temperature threshold value can be adjusted according to practical requirements.

The accuracy of distinguishing into high temperature thermal bridge effect or low temperature thermal bridge effect can be enhanced by the step S2051 determining whether the first measurement information is smaller than or equal to the third measurement information and by the step S2052 determining whether the first measurement information is larger than or equal to the third measurement information. Furthermore, the third alarm signal and the fourth alarm signal can include flashing alarms, sound alarms, or vibration alarms similar to those previously described. In other words, the flashing alarms, the sound alarms, and the vibration alarms are respectively produced by a laser module L, an audio unit 62, and a vibration unit 61. Preferably, the third alarm signal and the fourth alarm signal can be a flashing or a lighting of the third image (not shown in figure, such as but not limited to displaying "wrong object for detection" or "wrong target") on the display module D. That is, the third alarm signal and the fourth alarm signal can be used to remind users that a detection area may contain objects with higher temperature or lower temperature relative to the surroundings and the detection area is not suitable for determining high temperature thermal bridge effect and low temperature thermal bridge effect.

Referring to FIG. 6 and FIG. 7, for example, if the first predetermined temperature threshold value is 6.5° C., the second predetermined temperature threshold value is −6.5° C., the first measurement information (the temperature of the predetermined zone Z) is 35° C., the second measurement information (the temperature of the indoor environment) is 25° C., and the third measurement information (the temperature of the outdoor environment) is 10° C., the step S2064 (outputting the third alarm signal) can be performed after determinations of the step S2041, the step S2042, the step S2051, and the step S2052. Specifically, the temperature of the predetermined zone Z is higher than the temperature of the indoor environment and higher than the temperature of the outdoor environment. In the situation, the predetermined zone Z may contain stoves or heaters. Therefore, the third alarm signal is outputted to remind users that the detection area is not suitable for determining high temperature thermal bridge effect or low temperature thermal bridge effect.

Referring to FIG. 6 and FIG. 7, for example, if the first predetermined temperature threshold value is 6.5° C., the second predetermined temperature threshold value is −6.5°

C., the first measurement information (the temperature of the predetermined zone Z) is 15° C., the second measurement information (the temperature of the indoor environment) is 25° C., and the third measurement information (the temperature of the outdoor environment) is 35° C., the step S2065 (outputting the fourth alarm signal) can be performed after determinations of the step S2041, the step S2042, the step S2051, and the step S2052. Specifically, the temperature of the predetermined zone Z is lower than the temperature of the indoor environment and lower than the temperature of the outdoor environment. In the situation, the predetermined zone Z may contain air conditioners. Therefore, the fourth alarm signal is outputted to remind users that the detection area is not suitable for determining high temperature thermal bridge effect or low temperature thermal bridge effect.

In conclusion, the present disclosure provides a measuring method for high temperature thermal bridge effect or low temperature thermal bridge effect and a measuring system M thereof. Technical features of "outputting the first alarm signal when the difference between the first measurement information and the second measurement information is larger than the first predetermined temperature threshold value", "outputting the second alarm signal when the difference between the first measurement information and the second measurement information is smaller than the second predetermined temperature threshold value", and "outputting the first measurement information when the difference between the first measurement information and the second measurement information is between the first predetermined temperature threshold value and the second predetermined temperature threshold value" can determine whether the predetermined zone Z has high temperature thermal bridge effect or low temperature thermal bridge effect.

In addition, the measuring method for high temperature thermal bridge effect or low temperature thermal bridge effect and the measuring system M thereof can remind users of high temperature thermal bridge effect or low temperature thermal bridge effect by technical features of "flashing or lighting a first icon D11 on a display module D representing the first alarm signal and flashing or lighting a second icon D12 on the display module D representing the second alarm signal".

Moreover, the measuring system M for high temperature thermal bridge effect or low temperature thermal bridge effect can enhance the accuracy of determining high temperature thermal bridge effect and low temperature thermal bridge effect by the technical feature of "the signal receiver module 4 coupled with the microprocessor module 3 to receive the third measurement information obtained by measuring the temperature of the outdoor environment".

Furthermore, the measuring method for high temperature thermal bridge effect or low temperature thermal bridge effect can enhance the accuracy of determining high temperature thermal bridge effect and low temperature thermal bridge effect by technical features of "outputting the first alarm signal when the difference between the first measurement information and the second measurement information is larger than the first predetermined temperature threshold value and the first measurement information is smaller than or equal to the third measurement information", and "outputting the second alarm signal when the difference between the first measurement information and the second measurement information is smaller than the second predetermined temperature threshold value and the first measurement information is larger than or equal to the third measurement information".

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A measuring method for high temperature thermal bridge effect and low temperature thermal bridge effect, comprising steps of:
    obtaining a first measurement information by a predetermined zone temperature sensor module and obtaining a second measurement information by an indoor environment temperature sensor module; wherein the first measurement information is obtained by measuring a temperature of a predetermined zone and the second measurement information is obtained by measuring a temperature of an indoor environment;
    determining a relation between the first measurement information and the second measurement information by a microprocessor module; and
    outputting a first alarm signal, a second alarm signal, or the first measurement information by the microprocessor module;
    wherein the first alarm signal is outputted when a difference between the first measurement information and the second measurement information is larger than a first predetermined temperature threshold value;
    wherein the second alarm signal is outputted when the difference between the first measurement information and the second measurement information is smaller than a second predetermined temperature threshold value;
    wherein the first measurement information is outputted when the difference between the first measurement information and the second measurement information is between the first predetermined temperature threshold value and the second predetermined temperature threshold value.

2. The measuring method according to claim 1, wherein the step of obtaining the first measurement information and the second measurement information further includes obtaining a third measurement information by an outdoor environment temperature sensor module, the third measurement information is obtained by measuring a temperature of an outdoor environment.

3. The measuring method according to claim 2, further comprising a step of determining a relation between the first measurement information and the third measurement information by the microprocessor module; wherein the first alarm signal is outputted when the difference between the first measurement information and the second measurement information is larger than the first predetermined temperature threshold value and the first measurement information is smaller than or equal to the third measurement information; wherein the second alarm signal is outputted when the difference between the first measurement information and the second measurement information is smaller than the second predetermined temperature threshold value and the first measurement information is larger than or equal to the third measurement information.

4. The measuring method according to claim 1, wherein the first alarm signal is displayed by flashing or lighting a first icon of a display module, and the second alarm signal is displayed by flashing or lighting a second icon of the display module.

5. The measuring method according to claim 4, wherein a color of the first icon and a color of the second icon are different.

6. The measuring method according to claim 1, wherein the first alarm signal and the second alarm signal include flashing light alarms, audio alarms, and vibration alarms.

7. A measuring method for high temperature thermal bridge effect and low temperature thermal bridge effect, comprising steps of:
obtaining a first measurement information by a predetermined zone temperature sensor module, obtaining a second measurement information by an indoor environment temperature sensor module, and obtaining a third measurement information by an outdoor environment temperature sensor module; wherein the first measurement information is obtained by measuring a temperature of a predetermined zone, the second measurement information is obtained by measuring a temperature of an indoor environment, and the third measurement information is obtained by measuring a temperature of an outdoor environment;
determining a relation between the first measurement information and the second measurement information by a microprocessor module;
determining a relation between the first measurement information and the third measurement information by the microprocessor module; and
outputting a first alarm signal, a second alarm signal, or the first measurement information by the microprocessor module;
wherein the first alarm signal is outputted when a difference between the first measurement information and the second measurement information is larger than a first predetermined temperature threshold value and the first measurement information is smaller than or equal to the third measurement information;
wherein the second alarm signal is outputted when the difference between the first measurement information and the second measurement information is smaller than a second predetermined temperature threshold value and the first measurement information is larger than or equal to the third measurement information;
wherein the first measurement information is outputted when the difference between the first measurement information and the second measurement information is between the first predetermined temperature threshold value and the second predetermined temperature threshold value.

8. The measuring method according to claim 7, wherein the first alarm signal is displayed by flashing or lighting a first icon of a display module, and the second alarm signal is displayed by flashing or lighting a second icon of the display module.

9. A measuring system for high temperature thermal bridge effect and low temperature thermal bridge effect comprising:
a predetermined zone temperature sensor module;
an indoor environment temperature sensor module;
a display module; and
a microprocessor module coupled with the predetermined zone temperature sensor module, the indoor environment temperature sensor module, and the display module;
wherein the predetermined zone temperature sensor module provides a first measurement information to the microprocessor module, the indoor environment temperature sensor module provides a second measurement information to the microprocessor module, the first measurement information is obtained by measuring a temperature of a predetermined zone, and the second measurement information is obtained by measuring a temperature of an indoor environment;
wherein a first alarm signal is outputted from the microprocessor module when a difference between the first measurement information and the second measurement information is larger than a first predetermined temperature threshold value;
wherein a second alarm signal is outputted from the microprocessor module when the difference between the first measurement information and the second measurement information is smaller than a second predetermined temperature threshold value;
wherein the first measurement information is outputted from the microprocessor module onto the display module when the difference between the first measurement information and the second measurement information is between the first predetermined temperature threshold value and the second predetermined temperature threshold value.

10. The measuring system according to claim 9, wherein the first predetermined temperature threshold value and the second predetermined temperature threshold value are different.

11. The measuring system according to claim 9, further comprising a signal receiver module; wherein the microprocessor module is coupled with the signal receiver module to receive a third measurement information obtained by measuring a temperature of an outdoor environment.

12. The measuring system according to claim 9, further comprising a signal receiver module and an outdoor environment temperature sensor module; wherein the microprocessor module is coupled with the signal receiver module, the signal receiver module is coupled with the outdoor environment temperature sensor module, the outdoor environment temperature sensor module provides a third measurement information, and the signal receiver module receives the third measurement information; wherein the third measurement information is obtained by measuring a temperature of an outdoor environment.

13. The measuring system according to claim 9, further comprising a humidity sensor module coupled with the microprocessor module; wherein the humidity sensor module measures a dry-bulb temperature, a wet-bulb temperature, a dew point temperature, or relative humidity.

14. The measuring system according to claim 9, further comprising a laser module coupled with the microprocessor module, an audio unit coupled with the microprocessor module, or a vibration unit coupled with the microprocessor module; wherein the first alarm signal and the second alarm signal include flashing light alarms, audio alarms, or vibration alarms.

15. The measuring system according to claim 9, wherein the first alarm signal is displayed by flashing or lighting a first icon of the display module, and the second alarm signal is displayed by flashing or lighting a second icon of the display module.

\* \* \* \* \*